United States Patent [19]

Carter, Jr. et al.

[11] 4,424,861

[45] Jan. 10, 1984

[54] INFLATABLE ANCHOR ELEMENT AND PACKER EMPLOYING SAME

[75] Inventors: Ernest E. Carter, Jr.; Eugene E. Baker, both of Duncan, Okla.

[73] Assignee: Halliburton Company, Duncan, Okla.

[21] Appl. No.: 309,645

[22] Filed: Oct. 8, 1981

[51] Int. Cl.³ .......................................... E21B 33/127
[52] U.S. Cl. .................................... 166/120; 277/30; 277/230; 166/187; 166/212
[58] Field of Search ............... 166/120, 122, 179, 187, 166/195, 212; 277/95, 30, 31, 34, 34.3, 34.6, 229, 230

[56] References Cited

U.S. PATENT DOCUMENTS

| | | | |
|---|---|---|---|
| 1,828,381 | 10/1931 | Schuyler | 166/195 |
| 3,085,627 | 4/1963 | Sodich | 166/120 |
| 3,437,142 | 4/1969 | Conover | 166/187 |
| 4,191,383 | 3/1980 | Baker et al. | 277/34.6 |
| 4,253,676 | 3/1981 | Baker et al. | 166/122 |
| 4,310,161 | 1/1982 | Streich | 277/230 |
| 4,349,204 | 9/1982 | Malone | 166/120 |
| 4,372,562 | 2/1983 | Carter, Jr. | 166/120 |

*Primary Examiner*—James A. Leppink
*Assistant Examiner*—William P. Neuder
*Attorney, Agent, or Firm*—Joseph A. Walkowski; Thomas R. Weaver

[57] ABSTRACT

An inflatable packer element utilizing metal cable employed to reinforce the elastomeric packer bladder as an anchoring element. Steel cable is exposed along at least a portion of the packer element surface to engage a casing, liner or other conduit wall, or the wall of an open well bore. A seal may be effected at one or both ends of the packer element through use of a bonded elastomer cover which is pressed against the conduit wall by the expanded cable when the packer element is inflated.

25 Claims, 10 Drawing Figures

INFLATABLE ANCHOR ELEMENT AND PACKER EMPLOYING SAME

BACKGROUND OF THE INVENTION

In drilling, testing, treating and cementing petroleum wells, it is sometimes desirable or even essential that a portion of the well bore be isolated from the rest. Generally, this may be accomplished by setting an hydraulically inflatable packer incorporated in a string of drill pipe in a cased or open well bore. In many instances, while an inflatable packer of the prior art can accomplish a sealing function against high pressure well fluids, it cannot provide anchoring force equivalent to slips. Under an applied load the packer begins to move or "creep" in the well bore. This phenomenon of "creep" occurs because the packer elastomers act as a highly viscous fluid under high stresses. As maintaining precise location in the well bore is important in many instances, for example when treating or testing a particular producing zone, a conventional elastomeric inflatable packer is unsuitable due to its extremely limited anchoring capabilities. Several prior art attempts have been made to develop an inflatable anchor packer, without a great deal of success.

For example, U.S. Pat. No. 2,970,651 discloses an hydraulically inflatable retrievable anchor utilizing spring steel slips having serrations on their exterior, the slips being held against the well bore wall by an inner elastomeric bladder. This approach suffers from a number of disadvantages, including the inability to seal between pipe string and well bore and the limitation of anchoring capability. The latter disadvantage is due to the limited holding capacity of the serrations (which would not be very effective in a cased well) or the undesirability of making the packer extremely long to provide sufficient frictional force with smooth bands and serrated exterior surfaces. Moreover, only the outer layer of bands contact the well bore, again causing a reduction in frictional anchoring capacity. Finally, such smooth bands do not easily retract when the packer is deflated and therefore hinder further movement in the well bore.

U.S. Pat. No. 3,035,639 discloses an inflatable retrievable packer possessing slips at its top and bottom which are molded or otherwise secured to an elastomeric packer bladder, being biased outwardly against the well bore or casing wall when the bladder is inflated. Unlike U.S. Pat. No. 2,970,651, a seal is provided between the pipe string and well bore or casing wall. However, the anchoring capability is severely restricted frictionally due to the limited length of the slips which are employed, as well as the fact that each set (upper and lower) of slips will hold against pressure in only one direction. Moreover, the ultimate limitation in anchoring capacity for this device is the tensile yield strength of the bladder elastomer, as the slips are bonded to it and not attached mechanically to the packer in any manner. While the drawing figures indicate that the slips may be backed on metal end rings, this is only true for the instance when the well bore is only slightly greater in diameter than the packer, a disadvantage for pipe string movement, particularly in deviated wells where the packer must traverse a curve in the bore.

Canadian Pat. No. 702,327 discloses several different anchoring devices in an inflatable retrievable packer, among them an abrasive particle coating on the packer bladder (FIGS. 1, 2, 8, 9, and 10), metallic buttons embedded in the bladder (FIGS. 4 and 5) and serrated metallic jaws embedded in the bladder (FIGS. 6 and 7). All of these combinations possess a marked limitation in frictional engagement ability, as well as an ultimate anchoring strength limitation of the tensile yield strength of the bladder elastomer.

In addition to those instances when it is necessary or desirable to maintain location of a packer in a well bore, there are also many occasions during the inspection and repair of pipelines when it is necessary to seal off the bore of the pipeline at a given location. For example, a pipeline may require sealing at a certain point in order to patch a leak or allow replacement of a section. In other instances, the pipeline bore may be sealed and the pressure raised behind the sealing device in order to ascertain if a leak exists in a particular pipeline section, the presence of such leak being indicated by a failure of the pipeline to hold pressure. Several prior art approaches have been taken in the design of such sealing devices.

U.S. Pat. No. 3,593,749 discloses a pipeline pig stopper which relies on mechanical grippers or slips to fix the pig in the pipeline bore, after which an inflatable element is expanded to effect the actual seal. Major disadvantages of such a device include the limitation of gripping power due to the relatively small size and rigid configuration of the grippers, and damage incurred by the interior of the pipe in which the grippers are set. These grippers may not conform exactly to the pipeline bore wall, which may be lined with relatively soft plastics. Such plastics can be easily damaged by the gripper serrations, particularly if the grippers are not perfectly aligned with the bore wall.

U.S. Pat. No. 4,077,435 discloses a pipeline plugging apparatus which relies on stopping mechanisms inserted in the wall of the pipeline to arrest plug movement, subsequently sealing the pipeline bore with an expandable elastomer seal. Whie effective, the use of such stopping mechanisms necessarily limits the use of such plugs to instances where the pipeline is easily accessible and where a leak has already been located.

U.S. Pat. No. 4,079,755 discloses a rubber-covered inflatable pipeline plug reinforced with tire cord to withstand high inflation pressures. The utilization of an elastomer necessarily limits the anchoring force obtainable by the device, as the elastomer will tend to "creep" at high pipeline pressures, acting like a highly viscous fluid. Such "creep" is extremely undesirable, particularly when an exact pipeline location is desired for repair or leak location purposes.

An inflatable pipeline plug employing overlapping smooth metal bands as an anchor element is also known, with a rubber sealing element employed over a portion of the metal bands. However, such a device is not reusable due to the "set" that the bands take when the plug is expanded.

SUMMARY OF THE INVENTION

In contrast to the prior art, the inflatable anchor element of the present invention possesses the advantages of positive sealing against the casing, liner, conduit or well bore wall, as well as outstanding frictional anchoring capabilities which are independent of the tensile yield strength of the bladder elastomer.

The inflatable anchor element of the present invention may be used in a packer having a packer mandrel with an anchor shoe means at each end, one slidable on the mandrel and the other fixed with respect thereto. Between the anchor shoe means, and secured to each, is the anchor packer element comprising an inner bladder of an elastomeric material, surrounded by braided steel cable which is woven into a fabric-like envelope. At one or both ends of this envelope, depending on whether a fluid seal is desired against pressure in both axial directions, there is located an elastomer cover bonded to the woven cable and to the anchor shoe means. Between the elastomer covers, the woven steel cable is exposed. Upon inflation of the packer, the cable fabric will frictionally engage the casing, liner or well bore wall, providing an anchoring force. The cable is clamped to each end shoe, thus avoiding tensile stress on the inner bladder, and the fabric weave provides multitudinous points for frictional engagement of the cable. The flexible nature of the anchoring means, unlike the prior art, facilitates movement through the well bore and results in a packer which can be expanded to a greater extent than prior retrievable packers possessing an anchoring capability, as the anchoring element can expand beyond the radial extent of the anchor shoe means.

In another embodiment of the invention, the inflatable anchor element may be employed in a pipeline anchor having an inflatable elastomer bladder mounted on a mandrel. In this instance, the woven fabric of braided steel cable may be exposed throughout its axial extent to obtain greater frictional engagement and therefore anchoring capacity. When employed in an anchor, the packer element may also incorporate a layer of tire cord between the inflatable elastomer bladder and the metal fabric cover in order to prevent extrusion of the former through the latter. The use of this intermediate anti-extrusion layer is indicated due to the greater degree of expansion utilized in a pipeline anchor in comparison to a well bore packer. In lieu of a woven fabric, overlapping layers of calendered steel cables may be employed.

BRIEF DESCRIPTION OF THE DRAWINGS

The inflatable anchor element of the present invention will be more readily understood from the following detailed description, taken in conjunction with the accompanying drawings, in which.

DESCRIPTION AND OPERATION OF A FIRST PREFERRED EMBODIMENT OF THE INVENTION

Figure 1A:
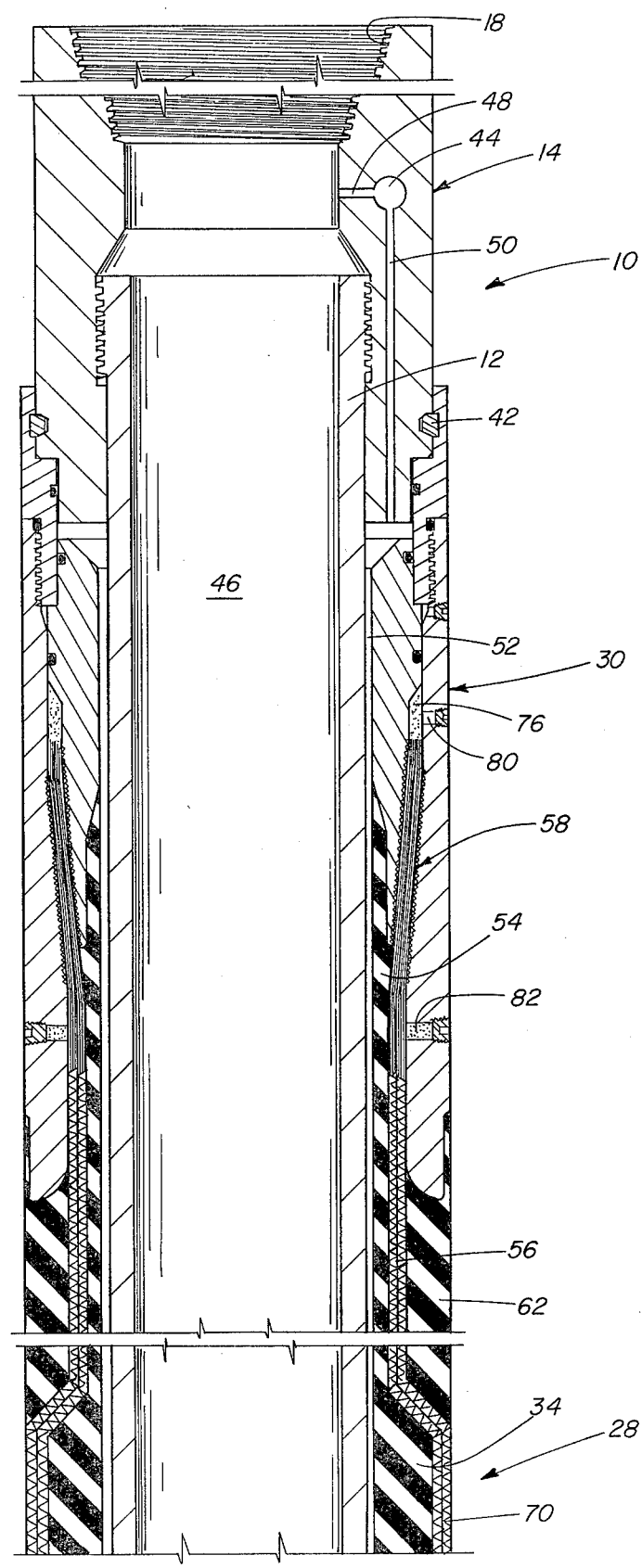
FIGS. 1A and 1B present a vertical cross-sectional elevation of a first preferred embodiment of the inflatable anchor element of the present invention.
Figure 1B:
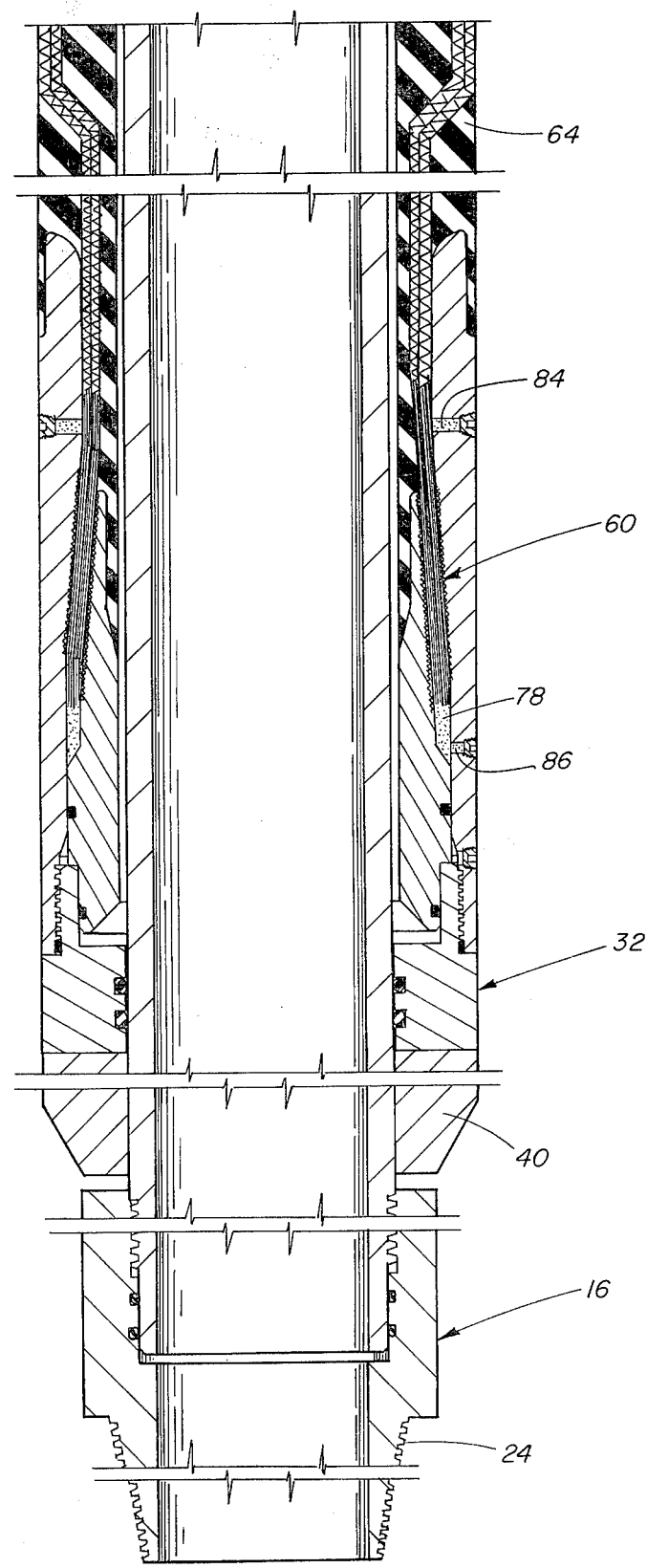

Referring now to the drawings and particularly to FIGS. 1A-1B, an inflatable anchor packer assembly employing a first preferred embodiment of the anchor element of the present invention is shown and generally designated by the numeral 10.

The inflatable packer assembly 10 includes a cylindrical inner mandrel 12 having upper and lower bodies 14 and 16 connected to its upper and lower ends, respectively.

Figure 2:
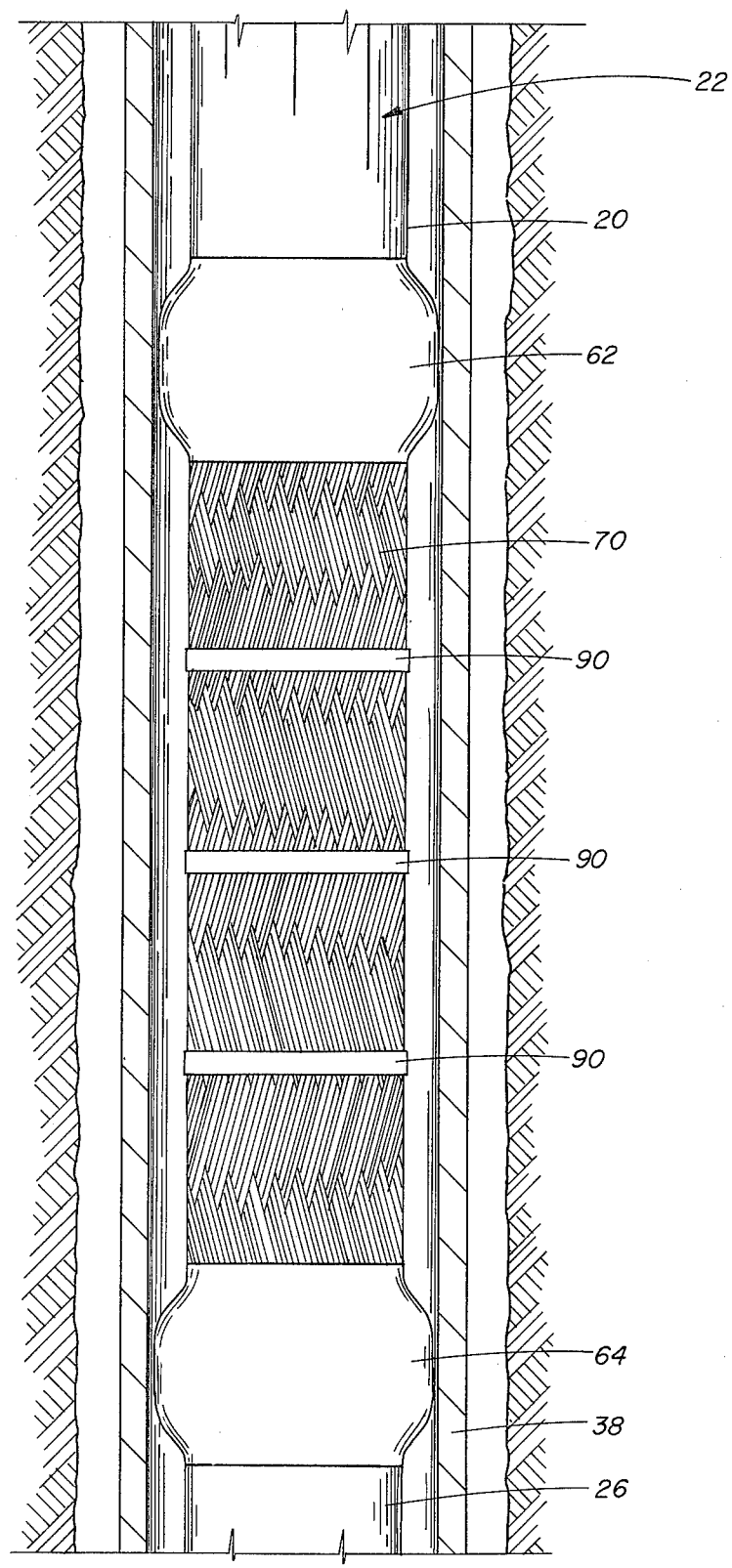
FIG. 2 is a vertical elevation of an inflatable retrievable anchor packer employing the anchor element of the present invention in an uninflated mode in a cased well bore.
Figure 3:
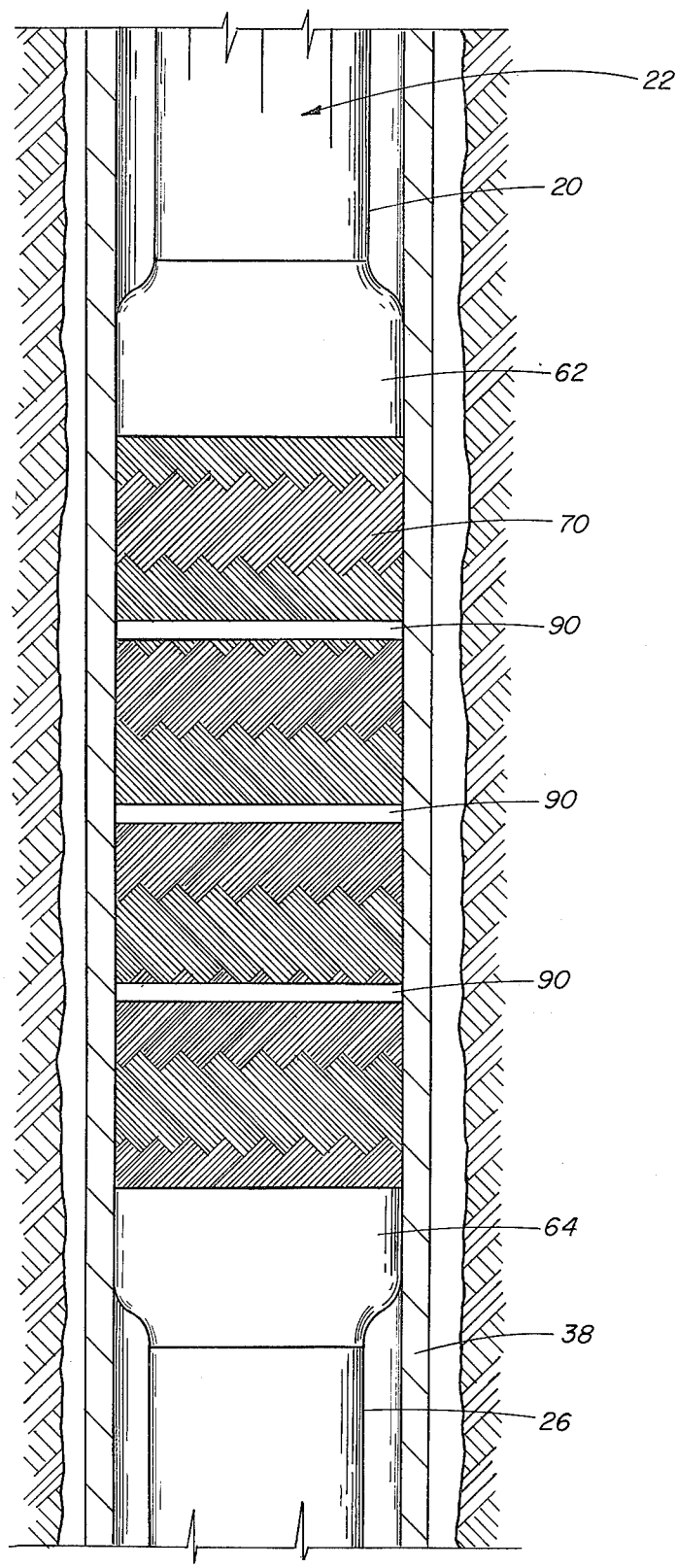
FIG. 3 is a vertical elevation similar to FIG. 2, after the inflatable retrievable anchor packer has been inflated.

The upper body 14 includes a threaded bore 18 which provides a means for connecting the inflatable packer assembly 10 to an upper portion 20 of a tubular drill string 22 within casing 38, as seen in FIGS. 2 and 3.

The lower body 16 includes an externally threaded portion 24 which provides a means for connecting the inflatable packer 10 to a lower portion 26 of the tubular drill string 22.

Disposed about mandrel 12 between upper and lower bodies 14 and 16 is an annular inflatable packer element generally designated by the numeral 28. The inflatable packer element 28 comprises an upper annular anchor shoe 30 and a lower annular sliding shoe 32, with an annular inflatable bladder 34 connected therebetween and disposed about said mandrel 12 for sealing an annular space 36 betwen drill string 20 and casing 38. Anchor shoe 30 and sliding shoe 32 are axially spaced.

The sliding shoe 32 slidingly engages the radially outer cylindrical surface of mandrel 12 near the lower body 16. When the bladder 34 is in the uninflated position as illustrated in FIGS. 1A and 1B the sliding shoe 32 is at its lowest position and freely engages a backup ring 40.

The upper anchor shoe 30 is fixedly attached to upper body 14 by suitable means such as wedge lock ring 42.

It should be noted that the upper and lower bodies 14 and 16 are illustrated only in a generally schematic form. Particularly the upper body 14 is schematically illustrated as including a valve means 44 for communicating well fluid from an interior 46 of the drill string 20 and casing 12 through inlet port 48 and outlet port 50 so that the well fluid is communicated with the small annular clearance 52 between the outer surface of mandrel 12 and the inner surface of inflatable packer element 28. In a manner well known to those skilled in the art, well fluid may be selectively directed from the interior 46 through port 48, valve 44, port 50 and clearance 52 to the bladder means 34 to inflate the same.

Inflatable bladder 34 includes a radially inner elastomeric element 54, preferably of natural rubber, connected between upper and lower shoes 30 and 32. The inner elastomeric element is surrounded by a reinforcing element 56 which is securely fastened or attached at its upper and lower ends to upper anchor shoe means 30 and lower sliding shoe means 32, respectively. This reinforcing element 56 may preferably comprise braided steel cable, or calendered steel cable. If braided steel cable is employed as shown in FIG. 1, the ends are left unbraided, the reason therefor which is explained hereafter.

In the embodiment illustrated in FIGS. 1A–1B each of the anchor shoe means 30 and sliding shoe means 32 includes tapered complementary wedging means 58 and 60, respectively, for rightly gripping the ends of reinforcing element 56.

Inflatable bladder elements with wedging connections and reinforcing elements securely fastened to those wedging elements are shown in U.S. Pat. No. 3,437,142 to Conover, U.S. Pat No. 3,160,211 to Malone, U.S. Pat. No. 3,085,628 to Malone, U.S. Pat. No. 3,085,627 to Sodich, U.S. Pat. No. 2,778,432 to Allen, and U.S. Pat. No. 2,643,722 to Lynes et al.

Bladder 34 further includes outer elastomeric coverings 62 and 64 (preferably of natural rubber) which surround the reinforcing element 56 at each end.

The reinforcing element 56 and the upper integral support means 64 of the inflatable bladder 34 are comprised of a plurality of layers of steel tire cord material or other similar reinforcing material.

The inner elastomeric element 54 is bonded to the radially inwardmost layer of the reinforcing element 56 for its entire length of contact therewith. Element 54 is also bonded to anchor shoe 30 and sliding shoe 32. Bonding takes place during the heat-curing of the packer element's elastomeric components.

The radially outer elastomeric coverings 62 and 64 should be bonded to upper anchor shoe 30 and lower sliding shoe 32 as well as to the radially outwardmost layer of reinforcing element 56.

It should be noted that reinforcing element 56 may comprise for example and not by way of limitation, braided steel cable. If braided steel cable is employed, it is woven into a fabric sleeve, depicted by numeral 70, being the center portion of element 56. The ends 72 and 74 of element 56, on the other hand, are left unwoven and the ends laid parallel to be gripped by wedging means 58 and 60, so as to spread the tensile stress evenly among the cable strands. To further enhance the gripping action of wedging means 58 and 60, epoxy is injected into annular recesses 76 and 78, respectively, through ports 80, 82, 84 and 86. All of the aforesaid ports are then plugged after the epoxy injection.

As is readily apparent from all of the drawing figures, center portion 70 of reinforcing element 56 is exposed, i.e. not covered with an elastomer. Thus, the steel cable has direct contact with the casing wall or borehole wall when packer 10 is inflated, the friction between the steel cable and the wall resulting in an anchoring effect. Due to the large surface area which may be exposed on center portion 70, the anchoring force far exceeds that which may be achieved with conventional slips. Moreover, because the center portion 70 is an integral part of reinforcing element 56 and is therefore not dependent upon the tensile strength of the elastomer bladder, a very substantial strength increase in the anchor itself is achieved.

In operation, anchor packer 10 is lowered on tubing string 22 into casing 38 which lines a well bore. Referring to FIG. 2, it is noted that there is substantial clearance between center portion 70 in its uninflated state and the wall of casing 38. Elastomeric bands 90 serve to maintain the packer in a collapsed state of minimum diameter. When anchor packer 10 reaches the desired level in the well bore, it is inflated with well fluid under pressure through the interior of tubing string 22 and valve 44. As the pressurized fluid expands inner elastomeric element 54, which in turn presses reinforcing element 56 outward, so that center portion 70 contacts and grips the casing wall. As can be seen in FIG. 3, when inner elastomeric element 54 is expanded, this overcomes elastomeric bands 90, stretching them outwardly along with center portion 70. In the inflated mode, elastomeric coverings 62 and 64 provide a seal between the packer and the casing wall. While two such elements have been shown, it should be understood that only one is needed to seal if pressure is to be applied to anchor packer 10 from only one direction, and if only an anchoring function is desired, the elements 62 and 64 may be eliminated entirely.

DESCRIPTION AND OPERATION OF A SECOND PREFERRED EMBODIMENT OF THE INVENTION

Figure 4:
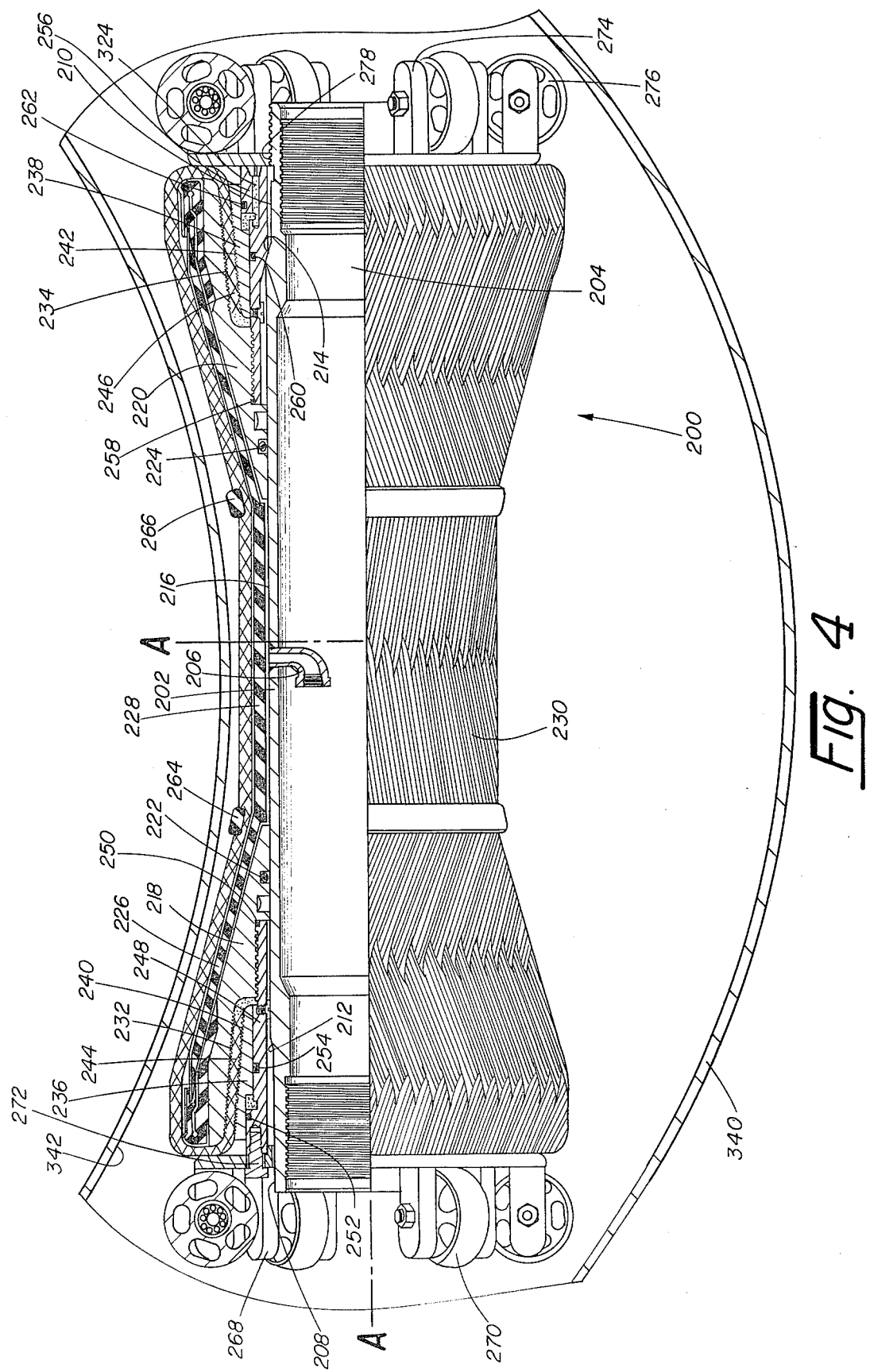
FIG. 4 is a half-section elevation of a second preferred embodiment of the inflatable anchor element of the present invention employed in an inflation anchor as it moves, uninflated, through a schematically depicted curved section of pipeline.
Figure 7:
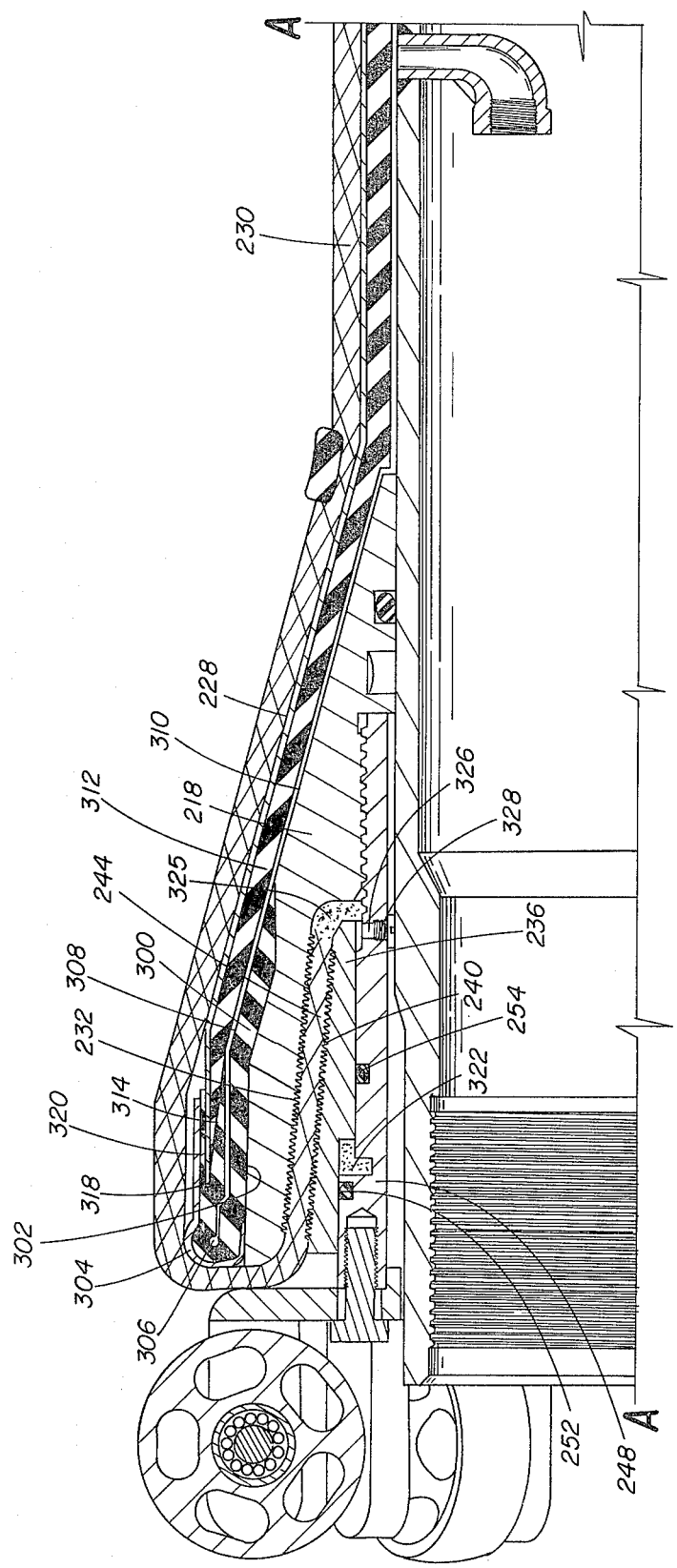
FIG. 7 is an enlarged section of a portion of the second preferred embodiment of the inflatable anchor element taken along lines A—A of FIG. 4.

Referring to FIGS. 4 and 7, a second preferred embodiment of the anchor element of the present invention is described hereafter.

Inflation anchor 200 comprises mandrel 202 having bore 204 therethrough. Inflation pipe 206 extends through the wall of mandrel 202. The exterior of mandrel 202 possesses arms 208 and 210 of substantially equal diameter at each end, followed by tapered annular surfaces 212 and 214, respectively, that lead to major surface 216 of a constant diameter.

Identical anchors 218 and 220 ride on major surface 216 of mandrel 202, a fluid seal between mandrel 202 and anchors 218 and 220 being effected by O-rings 222 and 224, respectively. Elastomeric bladder 226 envelopes mandrel 202 and extends substantially to the ends of anchors 218 and 220. Two layers of steel tire cord 228 are laid up on the outside of bladder 226, also extending substantially to the ends of anchors 218 and 220. The details of arrangement of bladder 226 and tire cord 228 will be discussed in greater detail hereafter with respect to FIG. 7. Woven steel cable fabric 230 surrounds tire cord 228, and extends beyond end shoes 218 and 220, being wrapped around the ends thereof and tucked against interior serrated surfaces 232 and 234. Wedges 236 and 238, having exterior serrated surfaces 240 and 242, are inserted within anchors 218 and 220, the free ends 244 and 246 of woven steel cable fabric 230 being thereby clamped between each anchor and its cooperating wedge.

At one end of anchor 200, floating end shoe 248 is threaded to anchor 218 to maintain wedge 236 in position as will be more fully explained hereafter. A fluid seal is made between anchor 218 and floating end shoe 248 by O-ring 250, and between wedge 236 and floating end shoe 248 by O-rings 252 and 254. Similarly, at the other end of anchor 200, fixed end shoe 256 maintains wedge 238 in position with respect to anchor 220, as will be more fully explained hereafter. A fluid seal is made between fixed end shoe 256 and anchor 220 by O-ring 258, and between fixed end shoe 256 and wedge 238 by O-rings 260 and 262.

Retractor bands 264 and 266, of elastomeric material, retain anchor 200 in a collapsed mode when not inflated.

Wheel assembly 268 having ball-bearing wheels 270 thereon is secured to floating end shoe 248 by bolts 272. In a similar manner, wheel assembly 274 having ball bearing wheels 276 thereon is secured to fixed end shoe 256 by bolts (not shown), and is threaded to mandrel 202 as indicated by reference numeral 278.

It may be noted at this time that the woven steel cable fabric may comprise 1/16"1×19 preformed stainless steel aircraft cable, woven 3 cables per bundle on a 15° bias (included angle) as shown in FIG. 1.

Referring now to FIG. 7, taken on lines A—A of FIG. 4, the arrangement of bladder 226 and tire cord 228 with respect to fabric 230 and the manner of constructing the anchor will be discussed in detail, the description being applicable to both ends of anchor 200. All elastomeric bladder elements are preferably formed of natural rubber. Bladder ends 300 of bladder 226 are bonded at 302 to the outer surface of anchor 218. Steel tire cord 304 is tucked under the end of bladder end 300 and folded over, two layers of tire cord being preferable. An O-ring 306 is tucked in the bight of the fold, as shown. Anti-bond paint is applied to outer surface 308 of bladder end 300, inclined surface 310 on anchor 318 and to the surface of the wrap mandrel upon which the anchor assembly is constructed (not shown). Bladder body 312 of bladder 226 is then fitted, there being preferably a one inch overlap 314 between bladder body 312 and bladder end 300. Two layers of steel tire cord 228 are laid up on bladder body 312 at a 15° included angle bias, extending to the end of bladder body at 318. A rubber spacer (location noted generally at 320) is placed over the end of cord 228, tire cord layer 304 then being folded over further into contact with rubber spacer 320. Woven cable fabric 230 is then fitted over tire cord 228, the free end 244 being bent inwardly and tucked under the end of anchor 218. Wedge 236 is then installed, and end shoe 248 threaded to anchor 218. An epoxy resin is then injected into annulus 322 through a longitudinal passage (not shown) extending to the outer end of end shoe 248. Such a passage is shown in end shoe 256 at 324 (see FIG. 4). The epoxy resin is injected preferably at a pressure of at least 1000 PSI, through a grease fitting which causes annulus 322 to enlarge axially and wedge 236 to move inwardly, clamping free end 244 of woven cable fabric 230 securely between serrated surfaces 232 and 240. The resin is maintained in annulus 322 by O-rings 252 and 254. Annulus 325 is then completely filled with epoxy resin through a plurality of apertures 326 spaced radially about the interior of end shoe 248. After filling, pipe plugs 328 are installed. The elastomer (natural rubber) portion of the assembly is then heat cured, which process bonds bladder body 312, bladder end 300, tire cord 228, rubber spacer 320, and tire cord 304 together. The anti-bond paint applied to surface 308 of bladder end 300 and anchor surface 310 prevents bonding at those areas, as well as to the wrap mandrel. The assembly is then placed on mandrel 202, with wheel assemblies secured to each end shoe and in the case of wheel assembly 274, to mandrel 202.

Figure 5:
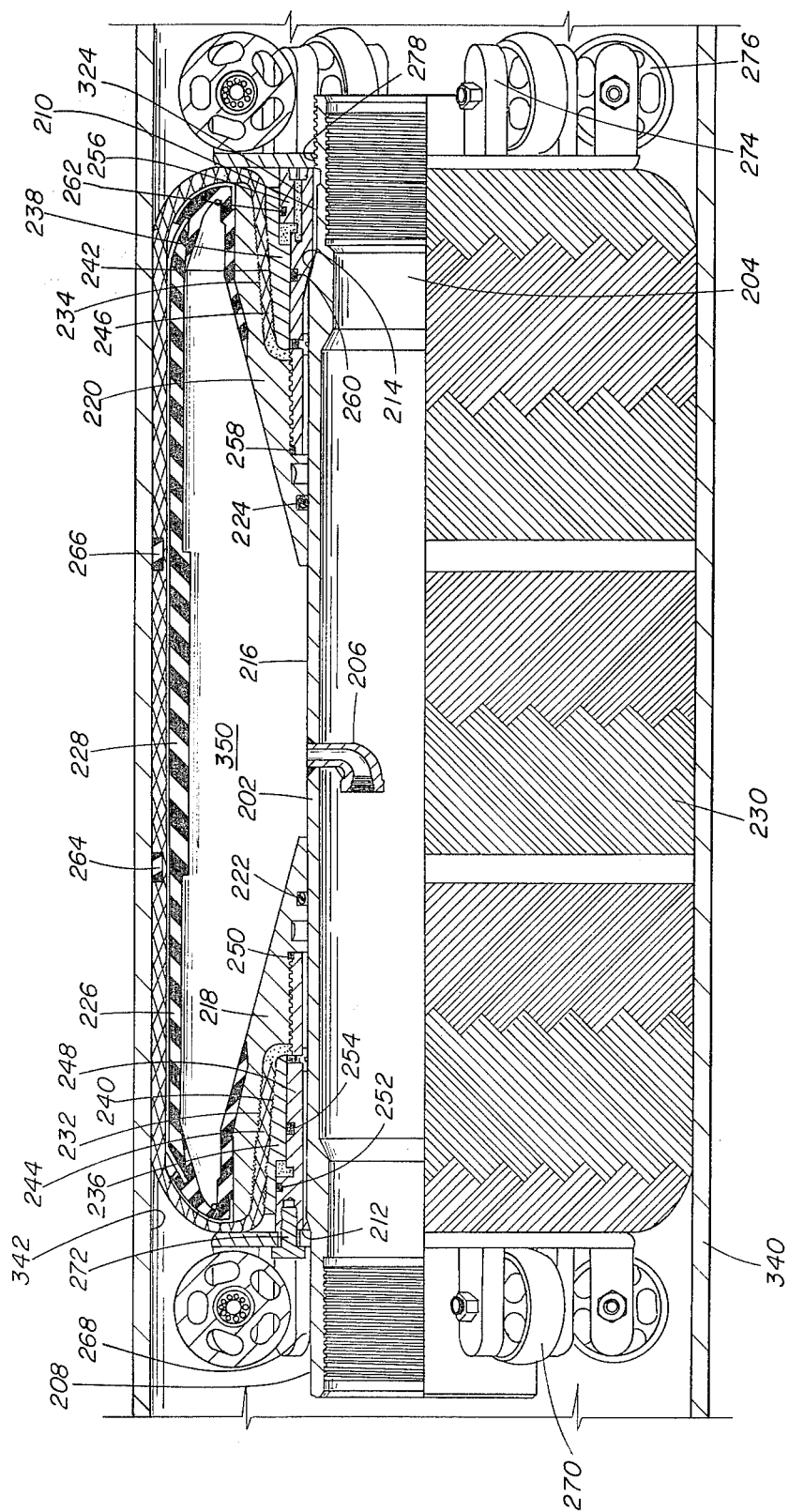
FIG. 5 is a half-section elevation of the second preferred embodiment of the inflatable anchor element of the present invention in an inflation anchor inflated in a schematically depicted straight pipeline section.
Figure 6:
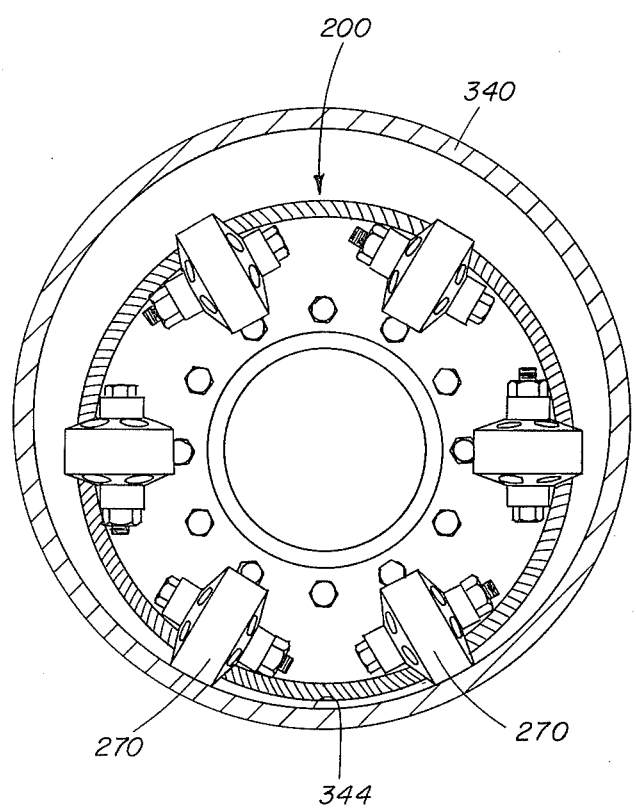
FIG. 6 is an end view of the inflation anchor in a straight section of pipeline prior to inflation.

Referring now to FIGS. 4, 5 and 6, the operation of the preferred embodiment of the inflation anchor of the present invention is described in detail hereafter.

Inflation anchor 200 is placed in a pipeline 340 and pumped to the desired location through the action of the fluid in the pipeline on a cup-type device to which inflation anchor 200 is secured, such a procedure being well known in the art. As can be readily seen in FIG. 1, the dumbbell shape of anchor 200 permits it to traverse a horizontal curve of substantially lesser radius than if the device were cylindrical with a substantially constant diameter the same as its outermost extending diameter. Wheels 270 and 276 are not in contact with the side pipeline wall 342 as it traverses the sharp curve, anchor 200 instead sliding along the wall 342 until the radius of curvature decreases enough for wheels 270 and 276 on the side of the anchor to make contact. As can be seen in FIG. 3, inflation anchor 200 rides on its wheels, referenced at 270, as they contact the bottom of pipeline wall 344 throughout its journey in the pipeline (unless an extremely sharp vertical rise or drop is encountered, in which case it will slide as noted above with respect to horizontal curves).

At the desired location, such as is shown in FIG. 5, inflation anchor 200 is inflated at 2500 PSI, for example, through a hydraulic line (not shown) connected to inflation pipe 206. The influx of hydraulic fluid, such as oil, expands elastomeric bladder 226, by creating expanded chamber 350 between mandrel 202, anchors 218 and 220, and the bonded together elastomeric bladder 226. Woven steel fabric 230 contains elastomeric bladder 226, preventing overstressing and rupture thereof. Free ends 244 and 246 are securely clamped between anchors 218 and 220 and their respective wedges 236 and 238. Steel tire cord 228 prevents elastomeric bladder 226 from extruding and rupturing through openings in the weave of fabric 230, which enlarge as inflation anchor 200 expands.

As inflation anchor 200 expands, fixed end shoe 256 remains stationary, being clamped between tapered annular surface 214 and wheel assembly 274, which is threaded to mandrel 202 and 278. Floating end shoe 248, on the other hand, slides axially inwardly upon major surface 216 of mandrel 202 to provide slack for outward radial expansion of fabric 230. As inflation anchor 200 expands and contacts the wall of pipeline 240 throughout its radial extent, wheels 270 and 276 are freed from contact with the pipeline.

Figure 8:
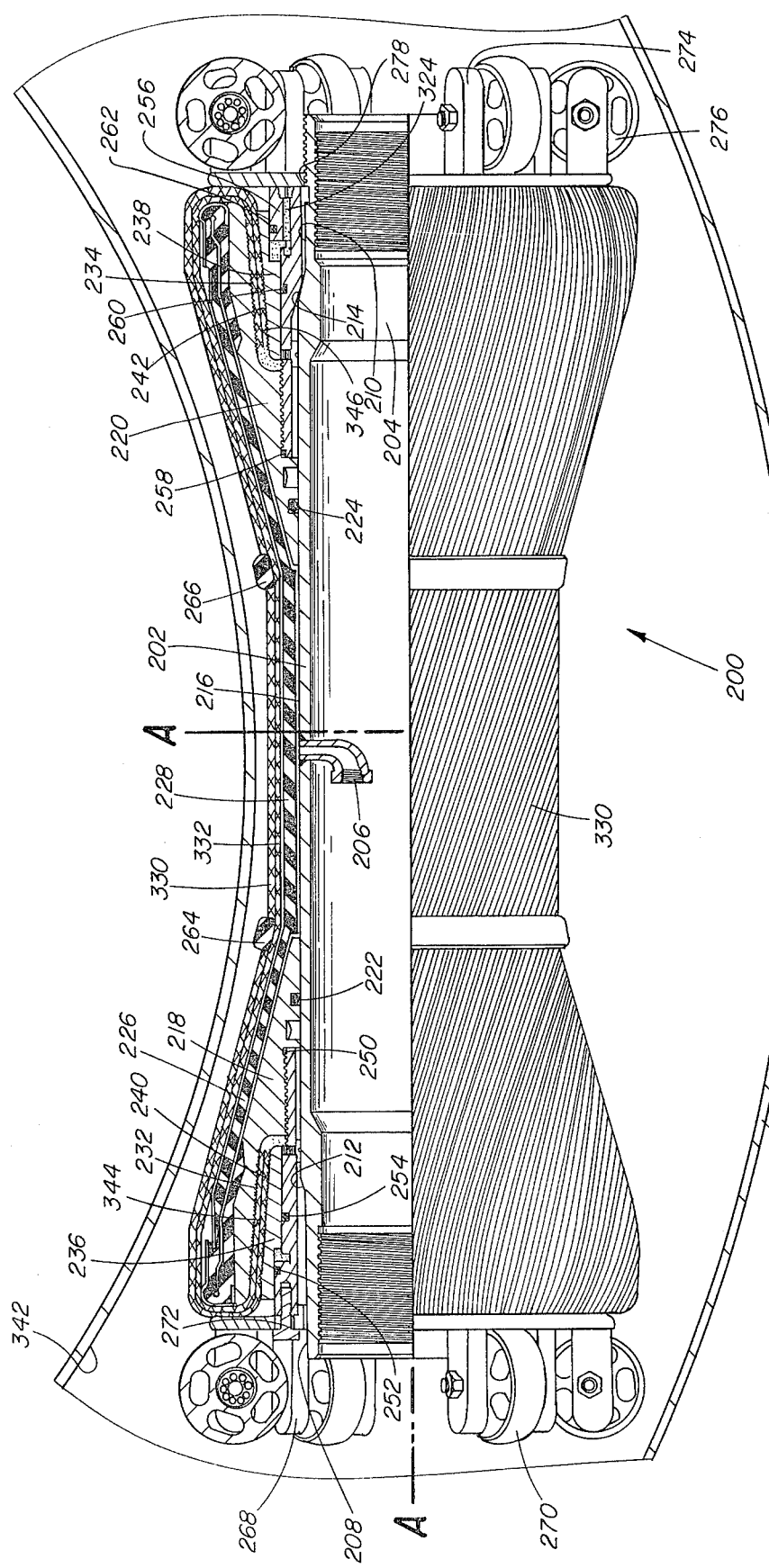
FIGS. 8 and 9 are half-section elevations of the second preferred embodiment of the inflatable anchor element of the present invention similar to FIGS. 4 and 5, but employing an alternative flexible anchor element construction.
Figure 9:
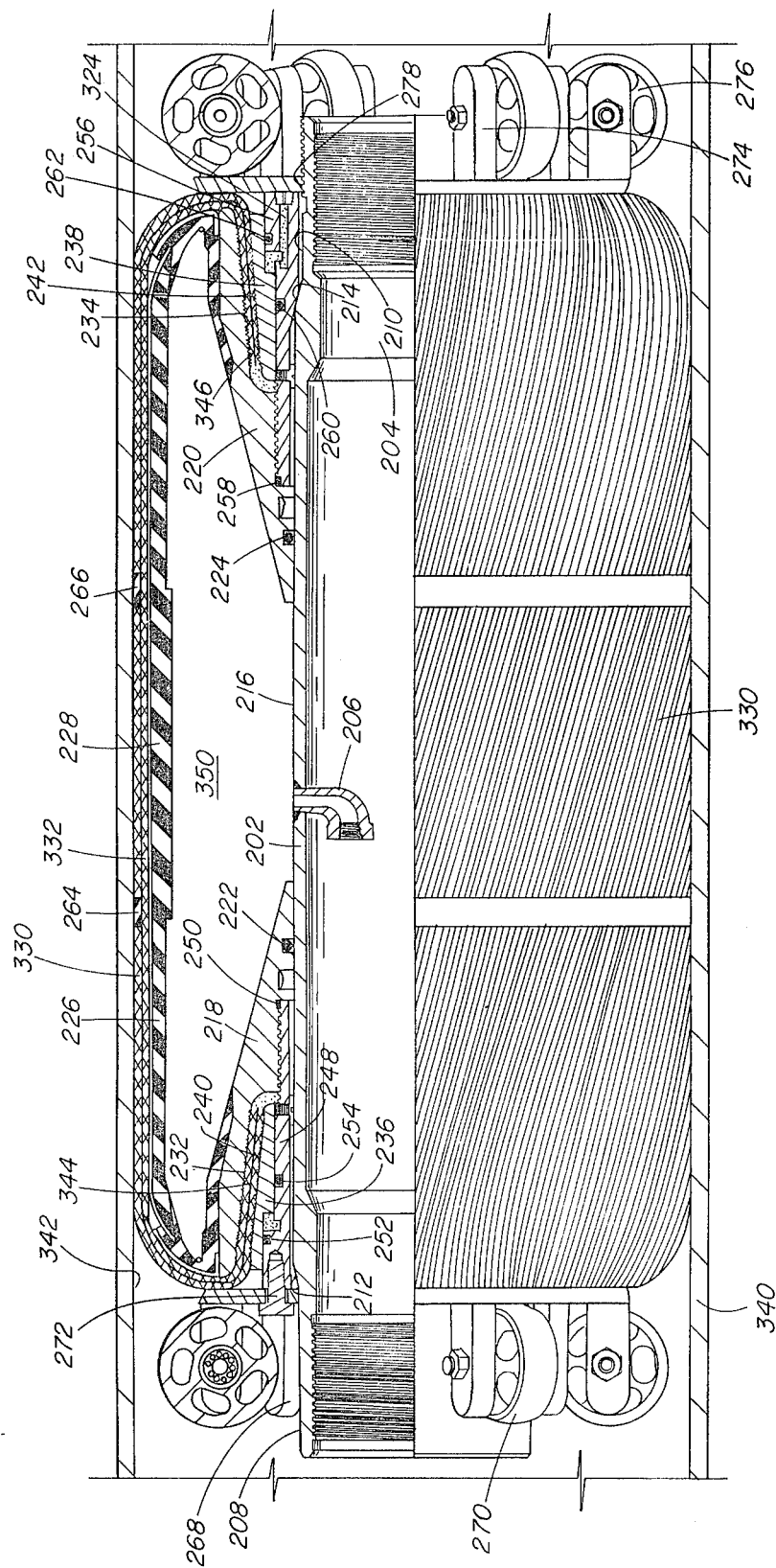

Referring to FIGS. 8 and 9, inflation anchor 200 is depicted employing two overlapping layers of calendered steel cable, 330 and 332, in lieu of the woven steel cable fabric 230 shown in FIGS. 4, 5, 6 and 7. The individual cables, while braided as those of fabric 230, comprise two distinct layers, each laid at an acute angle to the axis of inflation anchor 200, and at an acute angle (preferably 30°) to each other. The individual cables may preferably comprise 7×19 preformed stainless steel aircraft cable. With this type of construction, the expansion of inflation anchor 200 (as shown in FIG. 9) presents less of a problem with respect to the possible rupture of elastomeric bladder 226, as there is no fabric weave with openings that enlarge upon expansion of the fabric. Instead, the two layers of cable 330 and 332 expand substantially independently of each other, maintaining the substantially parallel relationship of the individual cables in each layer, thereby minimizing any gaps between cables. As a result, tire cord 228 is not absolutely necessary in the embodiment of FIGS. 8 and 9, as the possibility of bladder rupture through cable layers 330 and 332 is much more remote than with fabric 230. The parts and construction of inflation anchor 200 as shown in FIGS. 8 and 9 are substantially identical with that shown in FIGS. 4, 5, 6 and 7, there being therefore no need of further description in that respect. The operation of inflation anchor 200 of FIGS. 8 and 9 is likewise identical to that of inflation anchor 200 shown in FIGS. 4, 5, 6 and 7.

When inflation anchor 200 is fully inflated, a substantial axial force can be exerted upon it and any components to which it is connected, without any movement whatsoever. This is due to the extremely large surface area presented by expanded metal fabric 230 or parallel cables 330 for frictional engagement with the pipeline wall. This same large surface area, by providing multitudinous points for engagement, effectively distributes any axial force applied so that the longitudinal force against any particular portion of the pipeline wall is greatly reduced. The force distribution effect is enhanced by the fabric overwrap and internal clamping, which presents a much longer anchoring element for a given anchor length than is known in the prior art. It is thus apparent that the axial force exerted can be distributed sufficiently to prevent damage to even plastic liners for pipelines, while the anchoring force available is greatly increased. Furthermore, the anchoring force is not limited by the tensile yield strength of the elastomeric bladder, such as is known in the prior art, freeing the present invention from the danger of sudden failure through bladder rupture and the phenomenon of "creep" along the pipeline.

After inflation of the anchor 200, the pipeline may be sealed through use of a cup-type seal, such as would be used to move the anchor through the pipeline, or by an inflatable or expandable elastomer seal such as is known in the art. The desired testing or repair operation may then be performed. Upon completion of the desired operation, inflation anchor 200 is deflated by a release of pressure through inflation pipe 206, retractor bands 264 and 266 collapsing chamber 350 and moving fabric 230 or the layers of cable 330 and 332 away from contact with the pipeline wall. Anchor 200 and related devices may then be withdrawn from the pipeline.

It is thus apparent that a novel and unobvious anchor element has been disclosed. Of course, many modifications, deletions and additions may be made in variance of the disclosed preferred embodiments, without departing from the spirit and scope of the claimed invention. For example, the use of overlapping layers of calendered steel cable may be employed in packer assembly 10 in lieu of reinforcing element 56. Moreover, more than two layers of calendered cable may be employed in any of the disclosed anchor elements.

We claim:

1. An inflatable anchor element, comprising:
substantially tubular expandable and contractible bladder means;
end shoe means at each end of said bladder means; and
flexible expandable and contractible metallic anchor means on the exterior of said anchor element including a plurality of metal cables woven into a fabric secured to each of said end shoe means and surrounding said bladder means.

2. The anchor element of claim 1 wherein said metal cables comprise braided cables.

3. The anchor element of claim 1 wherein said braided cables are left unbraided and are laid substantially parallel where said flexible metallic anchor means is secured to said end shoe means.

4. The anchor element of claim 1 wherein said expandable bladder means comprises an elastomer.

5. The anchor element of claim 4 wherein said bladder elastomer comprises natural rubber.

6. The anchor element of claim 1 further comprising expandable circumferential seal means on the exterior of said anchor means on at least one end thereof.

7. The anchor element of claim 6 wherein said expandable seal means extends over a portion of said flexible metallic anchor means.

8. The anchor element of claim 7 wherein said seal means comprises an elastomer.

9. The anchor element of claim 8 wherein said seal elastomer comprises natural rubber.

10. The anchor element of claim 4 further comprising antiextrusion means between said woven braided steel cable and said elastomeric expandable bladder adapted to prevent the extrusion of said bladder material through gaps in the weave of the fabric as said anchor element is expanded by inflation of said bladder.

11. The anchor element of claim 10 wherein said antiextrusion means comprises tire cord.

12. An inflatable anchor packer comprising:
tubular mandrel means;
end shoe means mounted at each end of said mandrel means;
expandable and contractible bladder means extending between said end shoe means;
valve means adapted to inflate said expandable bladder means; and
flexible expandable and contractible metallic anchor means including a woven fabric of braided steel cable secured to each of said end shoe means and surrounding said bladder means.

13. The inflatable anchor packer of claim 12 wherein each end of said woven fabric has the strands of cable unwoven and laid substantially parallel to the axis of said mandrel means, said parallel strands being secured to said end shoe means.

14. The inflatable anchor packer of claim 13 wherein one of said end shoes is fixed to said mandrel means and the other slides thereon.

15. The inflatable anchor packer of claim 14 further comprising expandable circumferential elastomeric seal means on at least one end of the exterior of said inflatable anchor packer.

16. The inflatable anchor packer of claim 15 wherein said seal means is located on each end thereof.

17. The inflatable anchor packer of claim 15 or 16 wherein said elastomer comprises natural rubber.

18. The inflatable anchor packer of claim 15 or 16 wherein each of said seal means extends over a portion of said flexible metallic anchor means.

19. An inflatable packer element comprising:
substantially tubular expandable and contractible bladder means; and
metal expandable and contractible anchor means surrounding said bladder means, said metal reinforcing means comprising a plurality of metal cables laid in an unwoven manner in a plurality of distinct layers.

20. The apparatus of claim 12 wherein said bladder means is elastomeric.

21. The apparatus of claim 12 further including antiextrusion means between said bladder means and said anchor means, said antiextrusion means comprising tire cord.

22. The anchor element of claim 19 wherein the cables of an individual layer are laid in a substantial parallel relationship.

23. The anchor element of claim 22 wherein the cables of each layer are laid at an acute angle to the axis of the anchor element.

24. The anchor element of claim 23 wherein each of said layers is laid with its cable at an acute angle of at least one other of said layers.

25. The anchor element of claim 24 wherein said cables comprise braided steel cables.

* * * * *